US008186409B2

(12) United States Patent
Shao et al.

(10) Patent No.: US 8,186,409 B2
(45) Date of Patent: May 29, 2012

(54) TAG ABLATION MECHANISM AND TAG-AND-TAPE COMBINATION APPARATUS USING THE SAME

(75) Inventors: Kuei-Kai Shao, Taipei (TW); Pei-Chun Chen, Taipei County (TW); Chen-Shen Liu, Hsinchu (TW); Chin-Lu Huang, Taoyuan County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 406 days.

(21) Appl. No.: 12/621,690

(22) Filed: Nov. 19, 2009

(65) Prior Publication Data

US 2010/0307688 A1 Dec. 9, 2010

(30) Foreign Application Priority Data

Jun. 9, 2009 (TW) ............................... 98119159 A

(51) Int. Cl.
*B32B 37/22* (2006.01)

(52) U.S. Cl. ......... 156/522; 156/541; 156/577; 156/579

(58) Field of Classification Search .................. 156/523, 156/574, 577, 579, 714, 715, 719, 759, 764, 156/767, 516, 522
See application file for complete search history.

(56) References Cited

U.S. PATENT DOCUMENTS

| | | | | |
|---|---|---|---|---|
| 4,985,110 | A * | 1/1991 | Becker | 156/540 |
| 7,178,575 | B2 | 2/2007 | Yu Chen | |
| 7,343,954 | B2 * | 3/2008 | Yanagida et al. | 156/579 |
| 7,383,864 | B2 | 6/2008 | Hogerton et al. | |
| 2003/0183343 | A1 * | 10/2003 | Kawada | 156/510 |
| 2006/0260762 | A1 * | 11/2006 | Yu Chen | 156/584 |

* cited by examiner

*Primary Examiner* — Mark A Osele
(74) *Attorney, Agent, or Firm* — WPAT., P.C.; Justin King

(57) ABSTRACT

The present invention provides a tag ablation mechanism and a tag-and-tape combination apparatus using the same, wherein a driving gear is actuated to rotate by a rotating device by way of a lever to drive a driven gear to rotate so as to ablate a tag from a bottom paper extended from a tag roll on the driven gear. In the present invention, an ablated tag is capable of being combined with a tape so that the tag attached to the tape can be adhered to a packaged object. The mechanism and apparatus of the present invention are capable of adjusting a rotating arc length so as to handle various tags with different sizes and lengths and to complete tag ablation and tag-and-tape combination in each driving operation.

24 Claims, 14 Drawing Sheets

TAG ABLATION MECHANISM AND TAG-AND-TAPE COMBINATION APPARATUS USING THE SAME

FIELD OF THE INVENTION

The present invention generally relates to a tag attachment technology and, more particularly, to a tag ablation mechanism and a tag-and-tape combination apparatus using the same.

BACKGROUND OF THE INVENTION

Radio Frequency Identification (RFID) is a non-contact sensing technology, which uses radio frequency waves to transport information to be recognized, traced, sorted and verified so as to identify an object. Since each RFID tag is unique and contactless, RFID has attracted tremendous attention in the fields of industry and commerce. Generally, RFID tags can be attached to packages, housings, cargo containers or pallets.

However, for corporations, it is crucial to build up an RFID technology with less human labor and equipment cost. Currently, RFID tags are mostly attached onto packages or housings of products manually, which leads to bottleneck operations and additional human labor. For example, in a Taiwan-based foods corporation, it takes 3 to 5 people to complete RFID tag attachment and packages, which becomes a bottleneck that stops the manufacturing process and results in low throughput and high cost.

A conventional hand-held labeling machine generally comprises a main body, on which are disposed a furling shaft base and a device for ablating a tag from a bottom paper so that the user can ablate the tag and attach the tag onto a target object. For example, U.S. Pat. No. 7,178,575 discloses a labeling machine, capable of ablating a tag from a bottom paper. In U.S. Pat. No. 7,178,575, the tag on the bottom paper is introduced to an ablating plate so that the tag is ablated from the bottom paper (separable paper) while passing through the ablating plate. The ablated tag is then introduced to a tag output, while the bottom paper is introduced to a bottom paper output. Moreover, U.S. Pat. No. 7,383,864 discloses an RFID tag attachment device, which achieves positioning of the RFID tag using a sensor to drive a shaft to rotate.

SUMMARY OF THE INVENTION

In one embodiment, the present invention provides a tag ablation mechanism, comprising: a driving portion comprising a first shaft and a driving gear coupled to the first shaft; a furling portion coupled to an end of a bottom paper extended from a tag roll so as to furl the bottom paper; a driven portion comprising a second shaft capable of carrying the tag roll and a driven gear coupled to the second shaft and toothed with the driving gear, the driven portion being propping against the bottom paper extended from the tag roll so that a bending angle is formed by the bottom paper; a rotatary portion capable of providing a rotating force; and a lever having two ends coupled respectively to the rotatary portion and the first shaft, the lever delivering the rotating force so that the driving portion drives the driven portion to rotate and a tag is ablated from the bottom paper at the bending angle.

In another embodiment, the present invention further provides a tag-and-tape combination apparatus, comprising: a tape rotating portion capable of carrying a tape roll; a driving portion comprising a first shaft and a driving gear coupled to the first shaft; a furling portion coupled to an end of a bottom paper extended from a tag roll so as to furl the bottom paper; a driven portion comprising a second shaft capable of carrying the tag roll and a driven gear coupled to the second shaft and toothed with the driving gear, the driven portion being propping against the bottom paper extended from the tag roll so that a bending angle is formed by the bottom paper; a rotatary portion capable of providing a rotating force; and a lever having two ends coupled respectively to the rotatary portion and the first shaft, the lever delivering the rotating force so that the driving portion drives the driven portion to rotate and a tag is ablated from the bottom paper at the bending angle and attached on the first shaft rotating to combine the tag on the first shaft and a piece of tape from the tape roll.

In another embodiment, the present invention further provides a tag-and-tape combination apparatus, comprising: a tape rotating portion capable of carrying a tape roll; a driving portion comprising a first shaft and a driving gear coupled to the first shaft; a furling portion coupled to an end of a bottom paper extended from a tag roll so as to furl the bottom paper; a driven portion comprising a second shaft capable of carrying the tag roll and a driven gear coupled to the second shaft and toothed with the driving gear by way of a steering gear, the driven portion being propping against the bottom paper extended from the tag roll so that a bending angle is formed by the bottom paper; a rotatary portion capable of providing a rotating force; and a lever having two ends coupled respectively to the rotatary portion and the first shaft, the lever delivering the rotating force so that the driving portion drives the driven portion to rotate so that a tag on the tag roll is combined with a piece of tape on the tape roll and is then ablated from the bottom paper at the bending angle while the first shaft is rotating.

BRIEF DESCRIPTION OF THE DRAWINGS

These embodiments of the present invention will be readily understood by the accompanying drawings and detailed descriptions, wherein.

DETAILED DESCRIPTION OF THE EMBODIMENT

The present invention can be exemplified but not limited by various embodiments as described hereinafter.

The present invention provides a tag ablation mechanism and a tag-and-tape combination apparatus using the same. The tag ablation mechanism is capable of simplifying RFID tag attachment and can be used in an application wherein RFID tag attachment and packaging are integrated as one single process.

The present invention provides a tag ablation mechanism and a tag-and-tape combination apparatus using the same, wherein a driving gear is actuated to rotate by way of a lever to drive a driven gear toothed with the driving gear to rotate so as to ablate a tag from a bottom paper extended from a tag roll on the driven gear and combine the tag and a piece of tape. During the packaging process, both the tape and the tag can be attached onto the packaged object at the same time to reduce the time for the packaging process and thus the cost.

The present invention provides a tag ablation mechanism and a tag-and-tape combination apparatus using the same, wherein a driving gear is actuated to rotate by way of a lever to drive a driven gear toothed with the driving gear by way of a steering gear to rotate so as to combine a tag on a bottom paper extended from a tag roll on the driven gear and a piece of tape and then ablate the tag from the bottom paper using a tag ablation mechanism. During the packaging process, both the tape and the tag can be attached onto the packaged object at the same time to reduce the time for the packaging process and thus the cost.

Figure 1A:
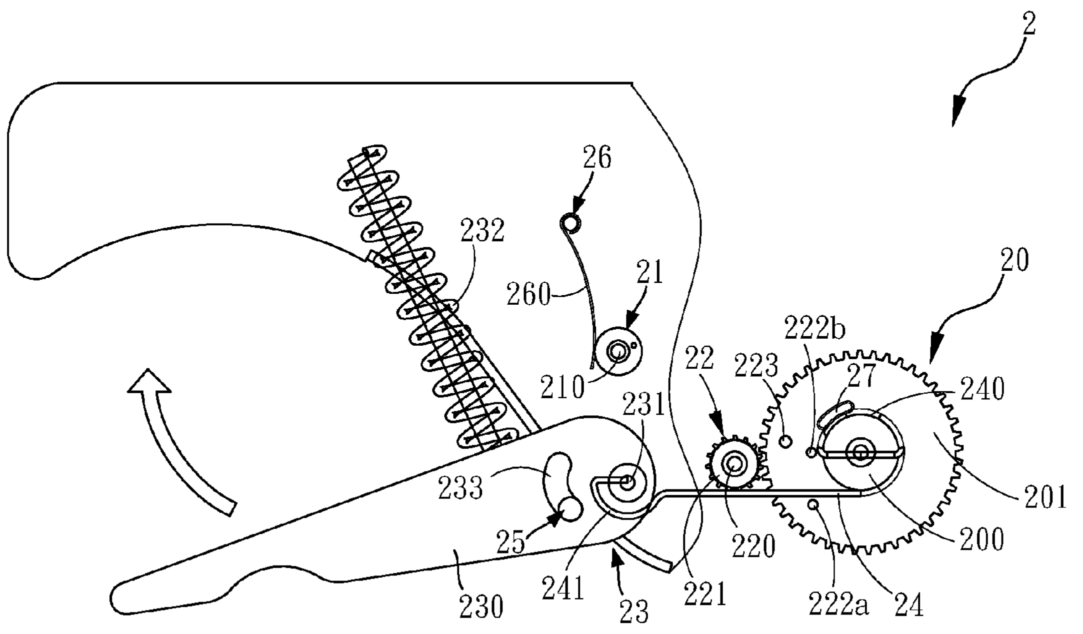
FIG. 1A is a side view of a tag ablation mechanism according one embodiment of the present invention.

Please refer to FIG. 1A, which is a side view of a tag ablation mechanism according one embodiment of the present invention. The tag ablation mechanism 2 comprises a driving portion 20, a furling portion 21, a driven portion 22, a rotatary portion 23 and a lever 24. The driving portion 20 comprises a first shaft 200 and a driving gear 201 coupled to the first shaft 200. The furling portion 21 comprises a furling shaft 210 to furl a tag from a bottom paper extended from a tag roll. On one side of the furling portion 21, a pressing portion 26 is provided comprising a resilient element 260 pressed against the bottom paper furled by the furling shaft 210. The driven portion 22 comprises a second shaft 220 and a driven gear 221. The second shaft 220 is capable of carrying a tag roll, while the driven gear 221 is coupled to the second shaft 220 and is toothed with the driving gear 201. The driven portion 22 further comprises a plurality of driven wheels 222*a*, 222*b* and 223. The driving gear 201 and the driven gear 221 are uni-directioal gears, which allows only one rotating direction. The uni-directioal gears are conventional mechanisms and descriptions thereof are not presented herein. The tag roll is a tag roll for RFID tags or for conventional information displaying tags. Moreover, an adjustment element 27 is disposed on the first shaft 200 so as to position the tag on the first shaft 200 and prevent the tag from deviating due to rotation.

The rotatary portion 23 provides a rotating force. In the present embodiment, the rotatary portion 23 comprises a handling portion 230, a rotary shaft 231 and a resilient element 232. The handling portion 230 is coupled to the rotary shaft 231 and is connected to the resilient element 232. The lever 24 has two ends respectively coupled to the rotatary portion 23 and the driving portion 20. In the present embodiment, the lever 24 comprises curved portions 240 and 241 on respective ends. The curved portion 240 has one end fixedly disposed on the shaft 200 of the driving portion 20, while the other curved portion 241 has one end fixedly disposed on the rotary shaft 231. An external force is applied on the handling portion 230 so that the handling portion 230 rotate clockwise with respect to the rotary shaft 231 to further drive the rotary shaft 231 to rotate clockwise. When the rotary shaft 231 is rotating, the curved portion 241 of the lever 24 also rotates to drive the other curved portion 240 to rotate and further deliver the rotating force to drive the first shaft 200 of the driving portion 20 to rotate and drive the driving gear 201 to rotate. When the driving gear 201 is rotating, the driven gear 221 toothed with the driving gear 201 also rotates. When the handling portion 230 is rotating clockwise, the resilient element 232 (for example, a spring in the present embodiment) is pressed. When there is no external force applied to the handling portion 230, an elastic restoring force of the resilient element 232 restores the handling portion 230 on its previous position so that the curved portion 241 of the drive lever 24 is also restored. Since the driven gear 221 in the present embodiment is uni-directioal, the driving gear 201 drives the driven gear 221 to rotate when the curved portion 241 of the lever is rotating. During restoring, the driven gear 221 is not driven by the steering gear drive. As a result, the second shaft 220 does not rotate so that the tag roll remains on its position. In another embodiment, the driving gear 201 is also uni-directioal to achieve the same performance.

Figure 2A:
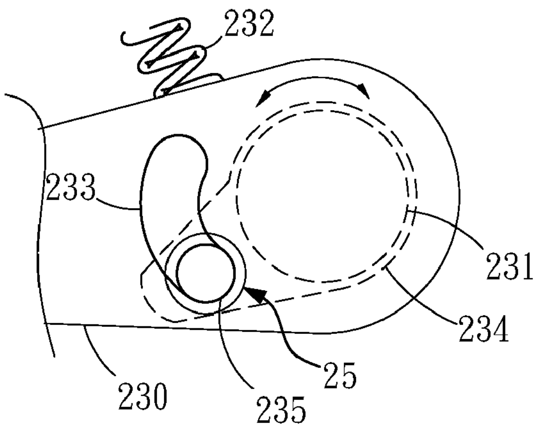
FIG. 2A to FIG. 2C are schematic diagrams showing adjustment of the position of the handling portion.
Figure 2B:
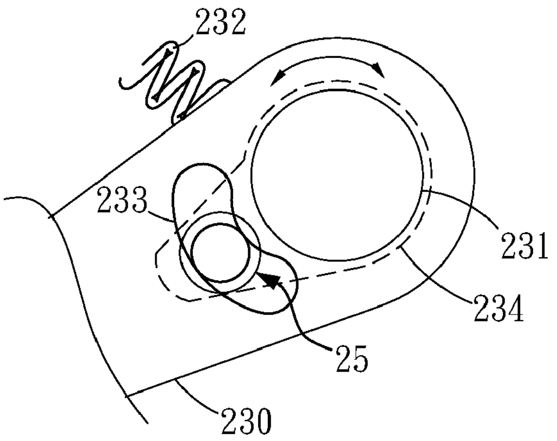
Figure 2C:
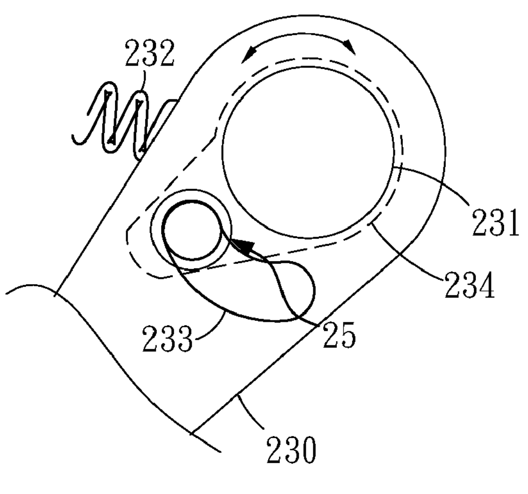

Moreover, to adjust the rotation stroke of the handling portion 230, the present invention controls the rotating length of the tag roll by controlling the rotating angles of the driving gear 201 and the driven gear 221. In the present embodiment, the handling portion 230 is provided with an opening 233 so as to dispose a position adjustment means 25 to adjust the position of the handling portion 230 to further change the rotation stroke of the handling portion 230 corresponding to the tag sizes. Please refer to FIG. 2A to FIG. 2C for schematic diagrams showing adjustment of the position of the handling portion. In the present embodiment, the rotary shaft 231 comprises a socket 234 tightly matched with the rotary shaft 231. The socket 234 is provided with a screw hole 235. The position adjust mechanism 25 can be a screw nut penetrating the opening 233 to fasten the handling portion 230 on the socket 234. For example, the handling portion 230 exhibits a minimum stroke in FIG. 2A and a maximum stroke in FIG. 2C. The rotation stroke of the handling portion 230 can be adjusted in many conventional ways, and is thus not limited to the embodiment above.

Figure 3:
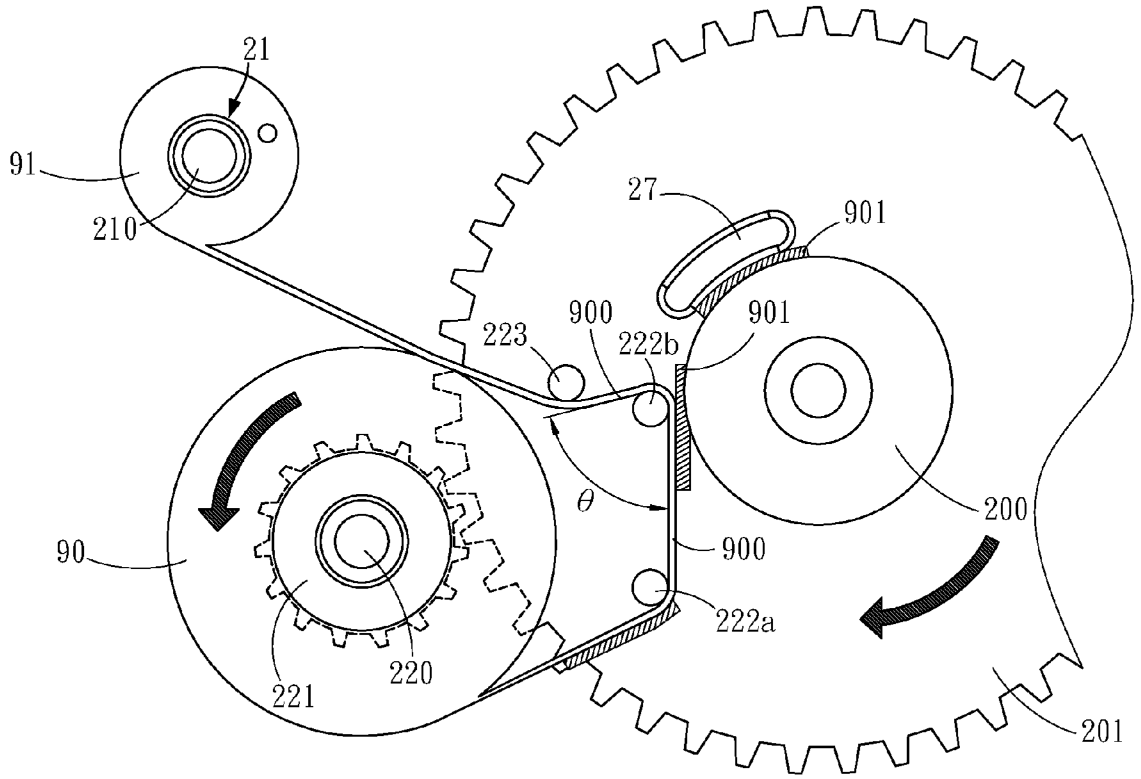
FIG. 3 is a schematic diagram showing tag ablation in the present invention.

Please refer to FIG. 3, which is a schematic diagram showing tag ablation in the present invention. Firstly, a tag roll 90 is disposed on the second shaft 220 and one end of a bottom paper 900 extended from the tag roll 90 along driven wheels 222*a*, 222*b* and 223 is disposed on a furling shaft 210 of a furling portion 21. Meanwhile, the first shaft 200 props against the corresponding bottom paper 900 comprising tags thereon. The driven wheel 223 is disposed to form a bending angle θ by the bottom paper 900 near the driven wheel 222*b* of the first shaft 200. When the lever 24 is driving the first shaft 200 to rotate clockwise, the first shaft 200 drives the driving gear 201 to rotate so that the driven gear 221 rotates counterclockwise. When the driven gear 221 is rotating counterclockwise, the furling portion 21 also rotates so that the tag 901 on the bottom paper 900 passing through the bending angle θ is ablated from the bottom paper 900. Since the first shaft 200 props against the tag 901, the tag 901 is ablated from the bottom paper 900 by a reaction force applied to the tag 901 by the rotating first shaft 200. Meanwhile, the bottom paper 900 without tags thereon is then furled on the furling shaft 210 by the rotating furling portion 21 to form a bottom paper roll 91 without tags thereon.

Figure 1B:
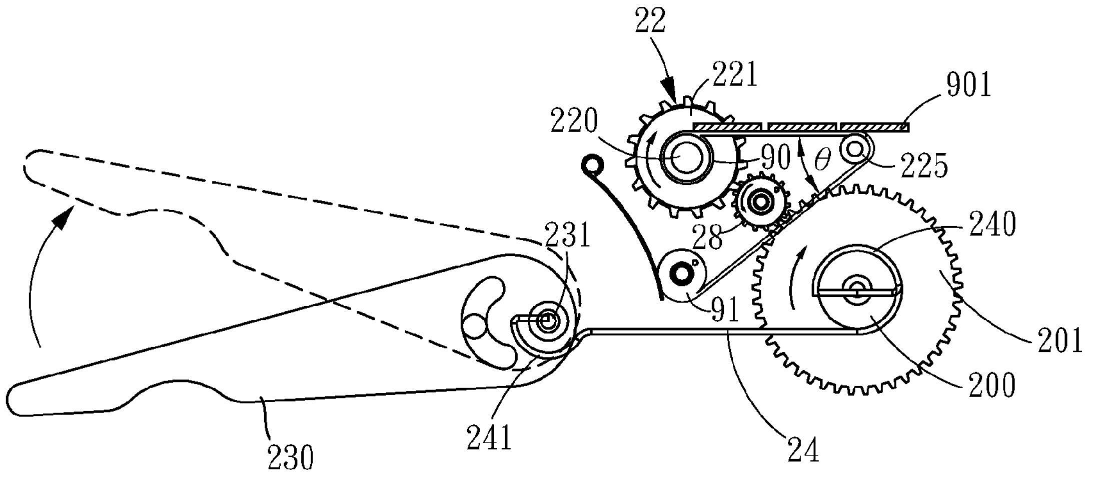
FIG. 1B is a side view of a tag ablation mechanism according another embodiment of the present invention.
Figure 4:
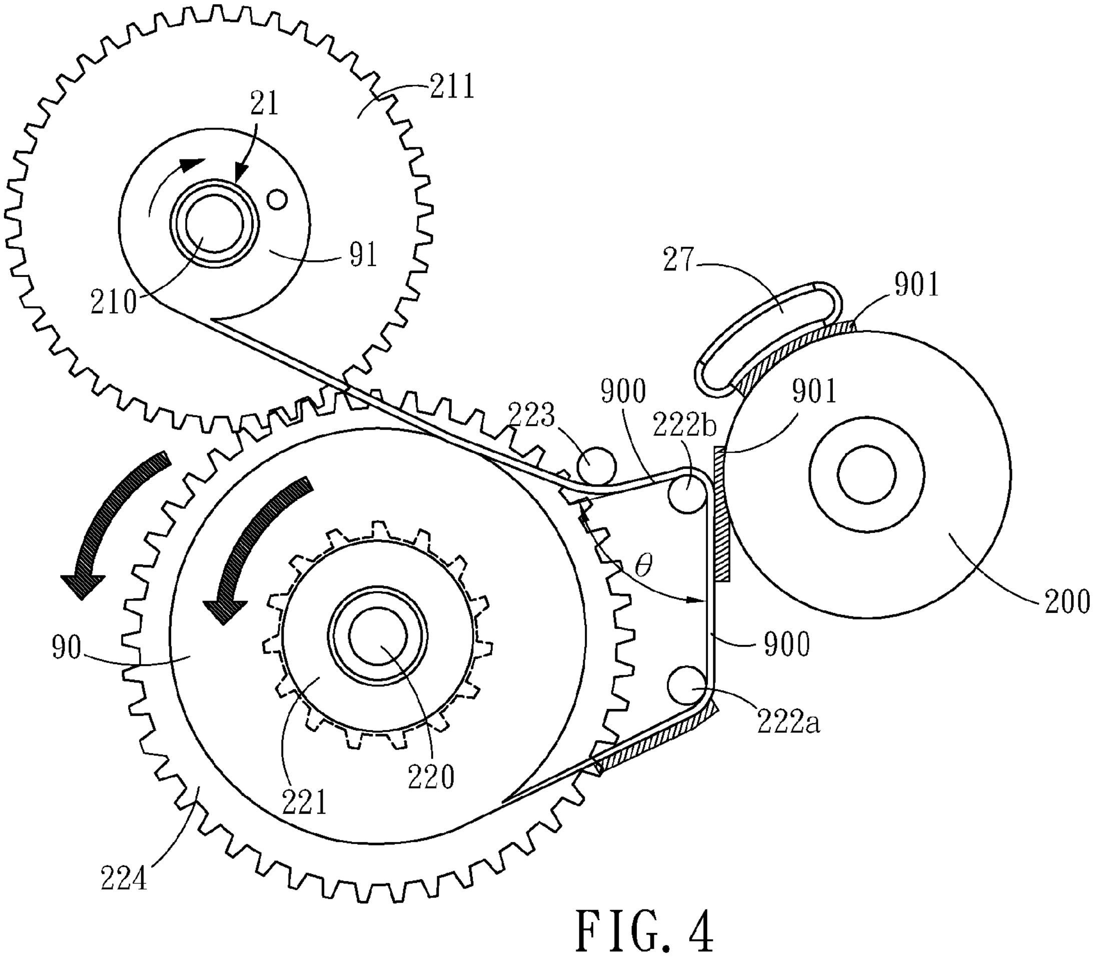
FIG. 4 is a schematic diagram showing rotation of a furling shaft.
Figure 5:
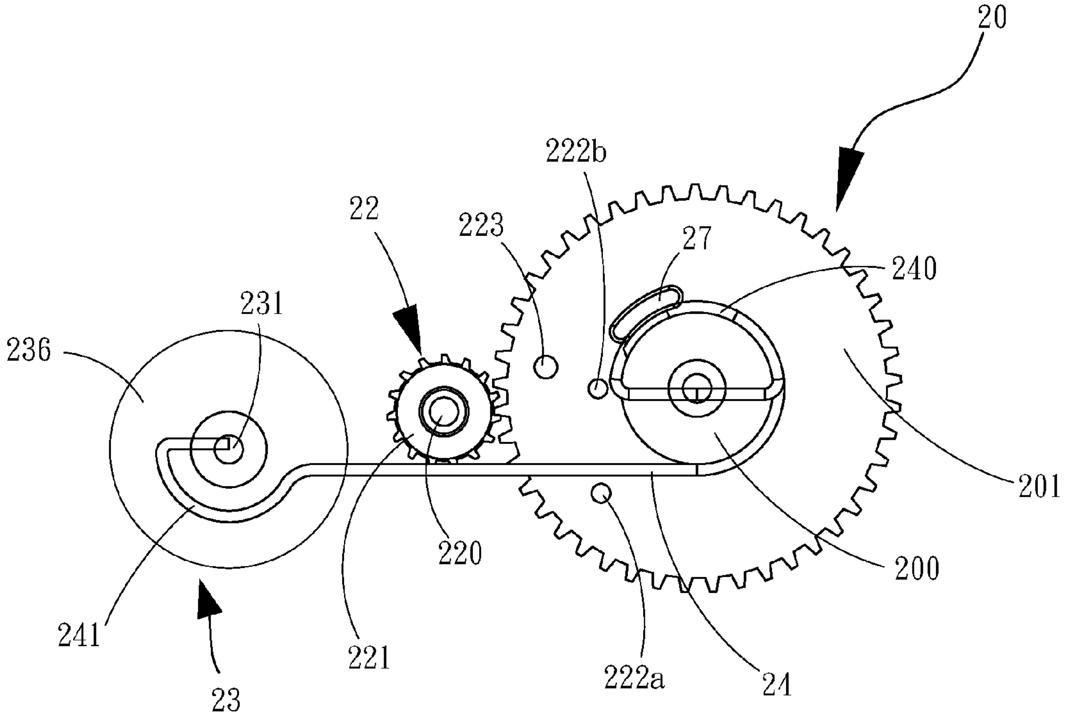
FIG. 5 is a schematic diagram of a rotatary portion according to one embodiment of the present invention.

The bottom paper without tags thereon is fured by the furling portion 21 in many ways. For example, please refer to FIG. 4, which is a schematic diagram showing rotation of a furling shaft. In the present embodiment, gears 211 and 224 toothed with each other are disposed respectively on the furling shaft 210 and the second shaft 220. When the second shaft 220 is rotating, the gear 224 drives the gear 211 to rotate so that the furling shaft 210 of the furling portion 21 rotates to furl the bottom paper. In another embodiment, the gear 224 can also be directly coupled to the first shaft 200. Moreover, a rotating force unit, for example, a motor can be used to provide power so that the furling shaft 210 of the furling portion 21 is able to rotate. Please refer to FIG. 5, which is a schematic diagram of a rotatary portion according to one embodiment of the present invention. The embodiment as shown in FIG. 5 is different from FIG. 1 wherein the handling portion is used to control rotation. Instead, in FIG. 5, the rotary shaft 231 and the rotating force unit 236 are directly coupled to control the rotation direction and the rotation stroke of the rotating force unit 236 (bi-directional stepping motor or servo motor) so as to achieve tag ablation.

In the embodiment shown in FIG. 1A, non-directional tags such as sensor-type RFID tags are considered. However, in FIG. 1B, which is a side view of a tag ablation mechanism according another embodiment of the present invention, the tags are directional. The present embodiment is essentially similar to the embodiment in FIG. 1A except that there is a steering gear 28 toothed between the driven gear 221 and the driving gear 201. The driven portion 22 further comprises an ablation wheel 225 disposed between the driven gear 221 and the furling portion 21 so that a bending angle θ is formed by the bottom paper at the ablation wheel 225. When the bottom paper with tags thereon passes through the ablation wheel 225, the tags can be ablated from the bottom paper due to the bending angle θ. Since the driven gear 221 in the present embodiment is uni-directioal, the driving gear 201 drives the driven gear 221 to rotate when the curved portion 241 of the lever is rotating. During restoring, the driven gear 221 is not driven by the steering gear drive. As a result, the second shaft 220 does not rotate so that the tag roll remains on its position. In another embodiment, the driving gear 201 or the steering gear 28 is also uni-directioal to achieve the same performance.

Figure 6:
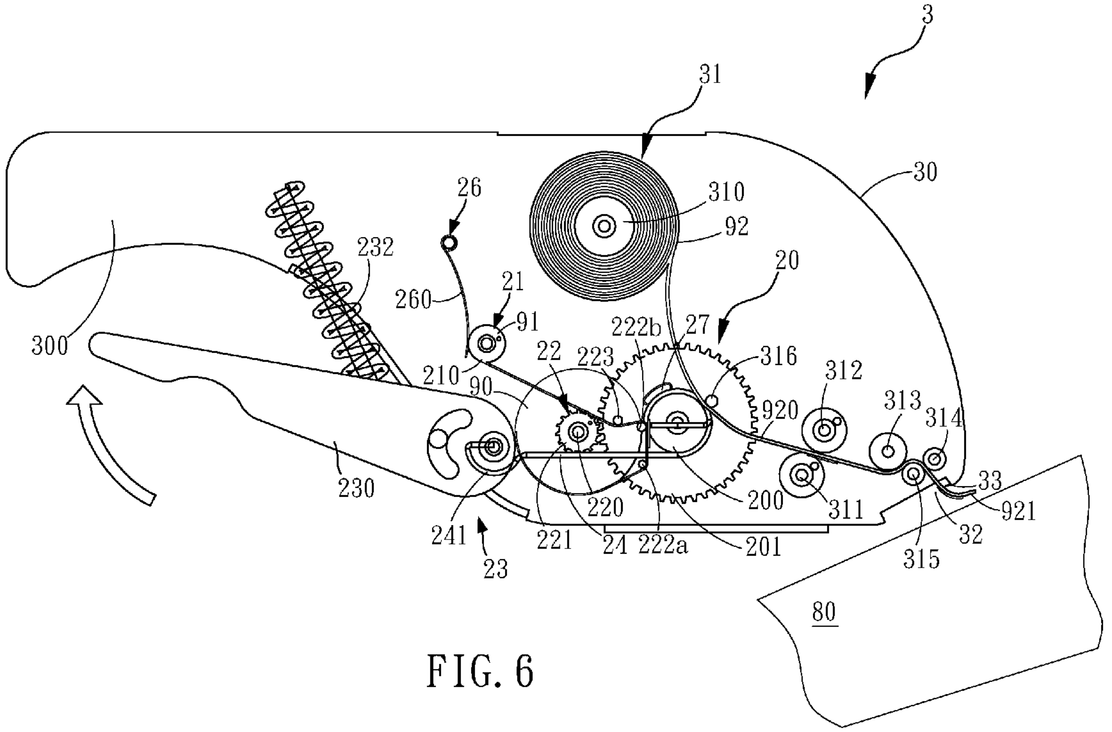
FIG. 6 is a side view of a tag-and-tape combination apparatus according to one embodiment of the present invention.

Please refer to FIG. 6, which is a side view of a tag-and-tape combination apparatus according to one embodiment of the present invention. In the present embodiment, the tag ablation mechanism in FIG. 1A and a tape rotating portion are combined. The tag-and-tape combination apparatus 3 comprises a housing 30 comprising a handle 300. The driving portion 20, the furling portion 21, the driven portion 22 and the lever 24 are disposed in the housing 30. A handling portion 230 of the rotatary portion 23 is extended throughout the housing 30. The resilient element 232 is connected to the handle 300 and the handling portion 230 so that the user is able to hold the handle 300 and the handling portion 230 is the hand. The tape rotating portion 31 comprises a tape shaft 310 wherein the tape roll 92 is disposed. The tape rotating portion 31 further comprises a plurality of rollers 311 to 316 and is disposed at the front end of the housing 30. One end 921 of the piece of tape 920 of the tape roll 92 is extended from the tape roll 92 and the piece of tape 920 is pressed against the plurality of rollers 311 to 316 to come out of the housing 30 from an exit 32. The piece of tape 920 has one region being pressed against the first shaft 201. The exit 32 is further provided with a cutting tool 33 to cut off the tape.

Figure 7A:
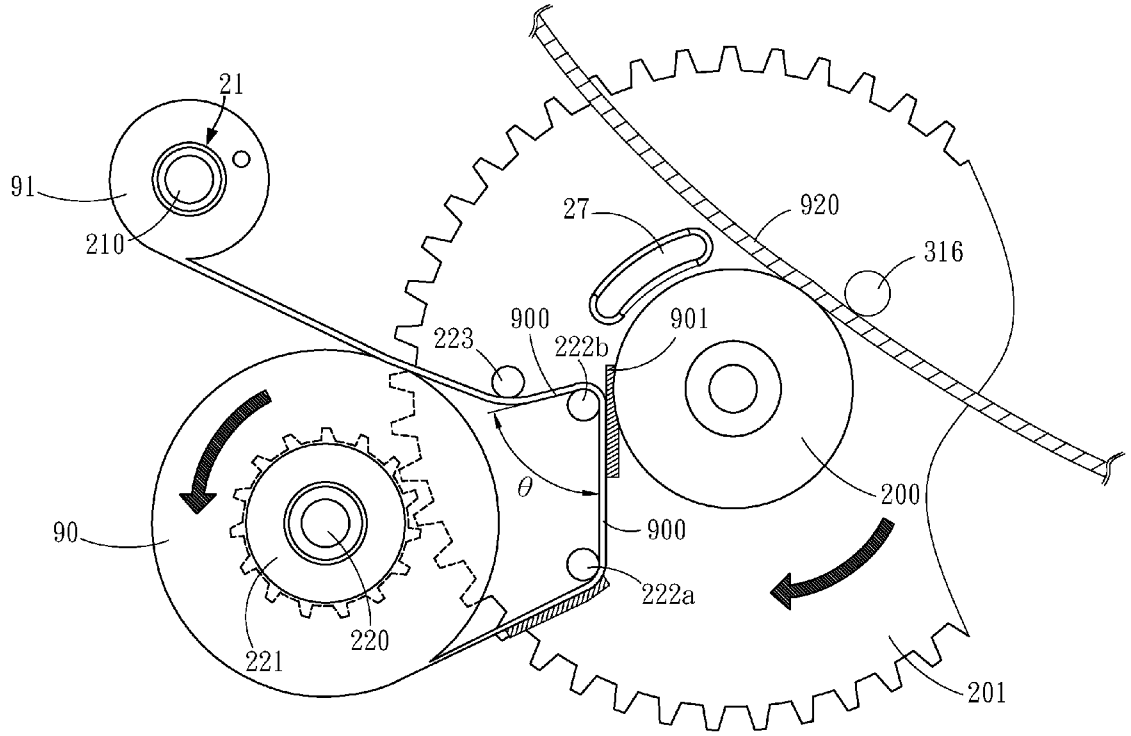
FIG. 7A to FIG. 7C are schematic diagrams showing tag-and-tape combination.
Figure 7B:
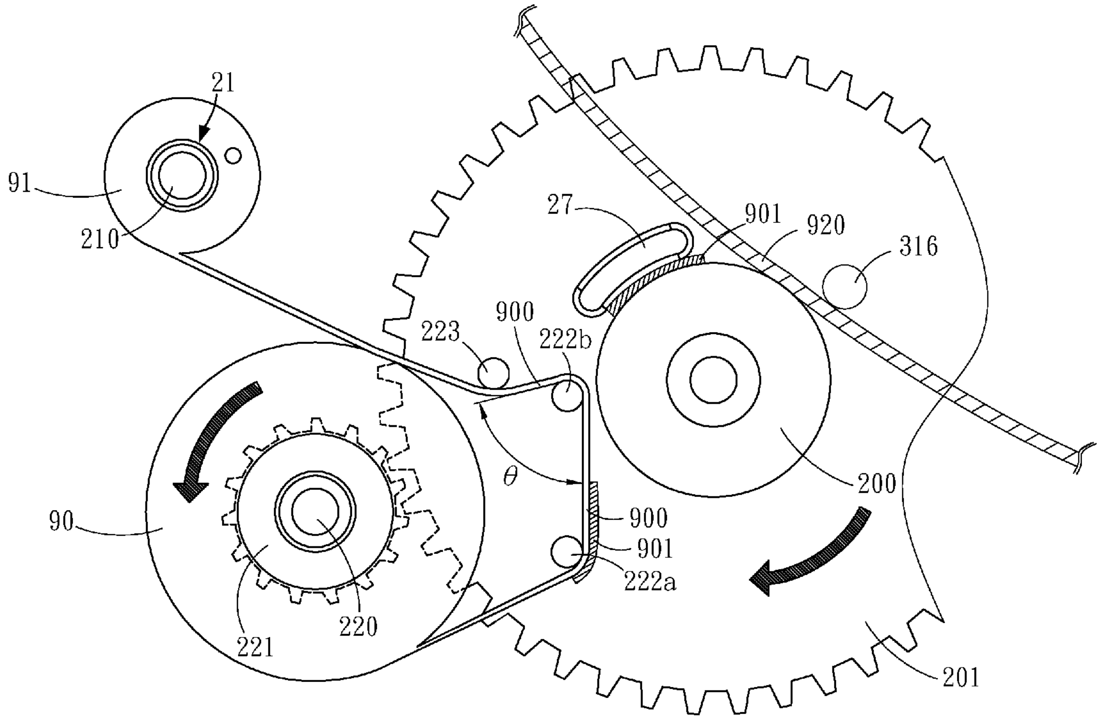
Figure 7C:
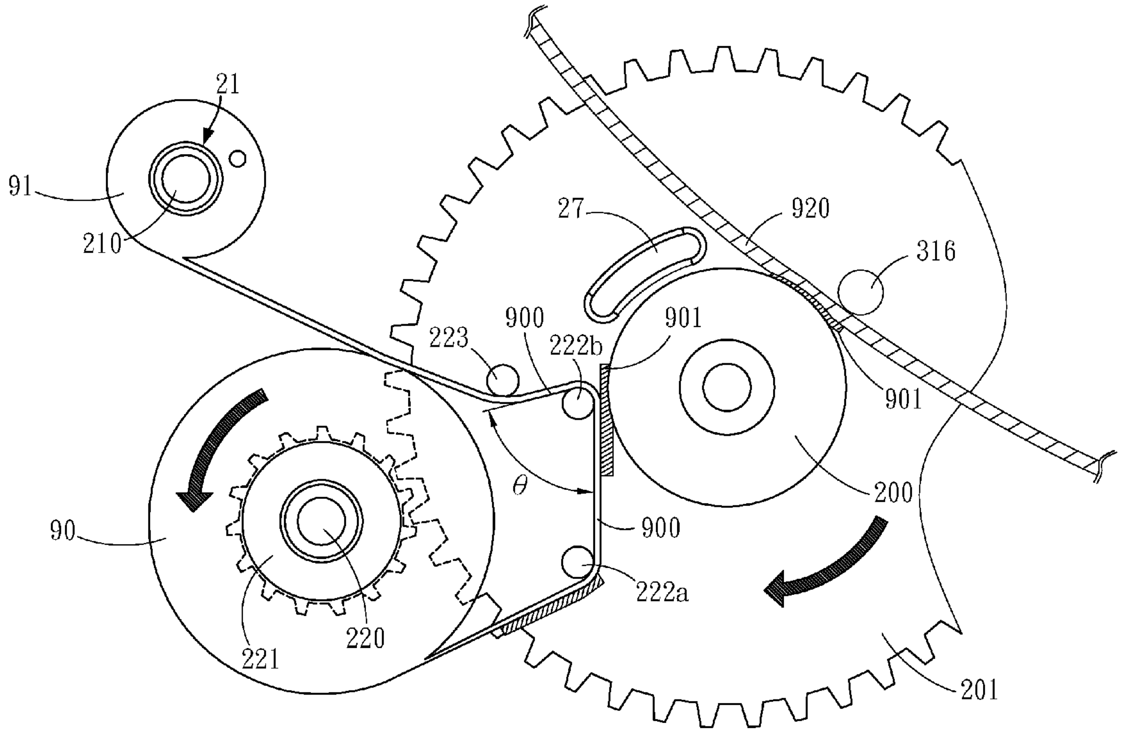
Figure 8A:
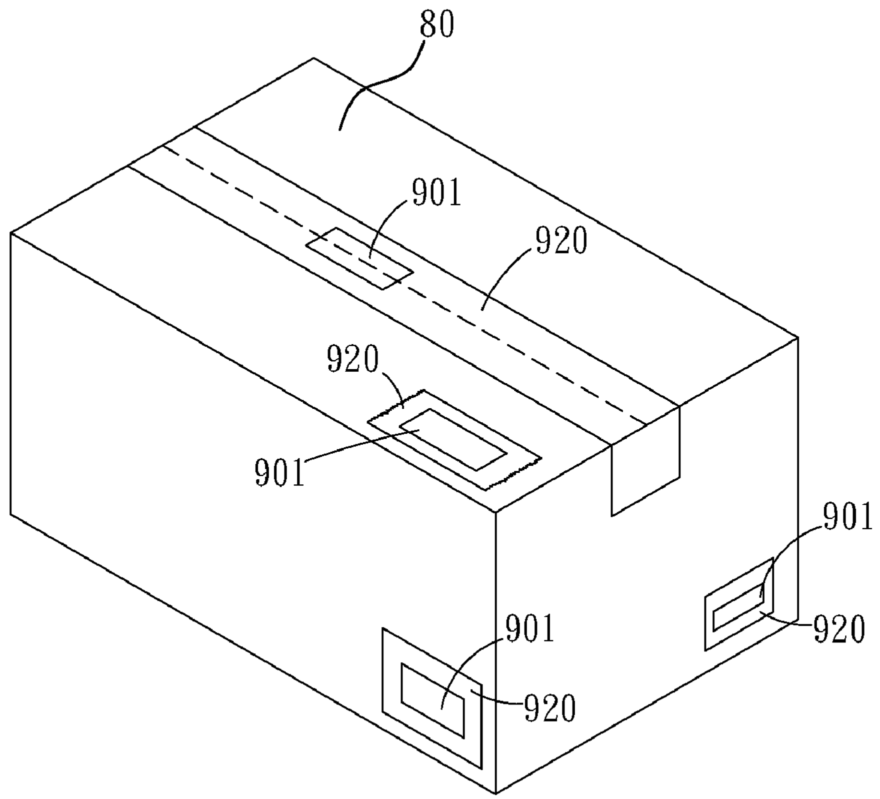
FIG. 8A and FIG. 8B are schematic diagrams showing a completed package.
Figure 8B:
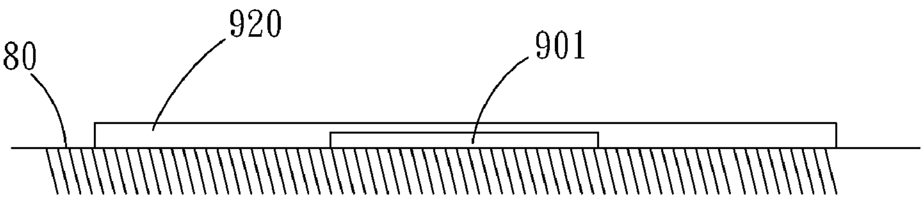

The operation of the tag-and-tape combination apparatus of the present invention is described herein. In FIG. 5 and FIG. 7A to FIG. 7C, wherein FIG. 7A to FIG. 7C are schematic diagrams showing tag-and-tape combination. As the tape roll 92 is disposed on the tape rotating portion 31, the piece of tape 920 is pressed by the rollers 311 to 316 so that part of the piece of tape 920 is against the first shaft 200. When the user rotates the handling portion 230, the handling portion 230 rotates clockwise to drive the driving gear 201 and thus the driven gear 221 to rotate, of which the description is similar to the description with FIG. 3 and thus is not repeated herein. As the tag 901 passes through the bending angle θ, part of the tag 901 is ablated from the bottom paper (as in FIG. 7A). Since the first shaft 200 props against the tag 901, the tag 901 can be ablated from the bottom paper by rotating the first shaft 200, as shown in FIG. 7B. Referring to FIG. 7C, the first shaft 200 continues to rotate and combines with the piece of tape 920. During a rotation from bottom up of the handling portion 230, a tag 901 can be attached onto the piece of tape 920 as shown from FIG. 7A to FIG. 7C. The user can further use the combination apparatus 3 to enclose or package the object (for example, a package or a box) 80 or use the tape to attach the tag onto the surface of the object. As shown in FIG. 8A and FIG. 8B for schematic diagrams showing a completed package, the piece of tape covers the tag. In addition to enclosing the package or the box 80, the combination apparatus can also be used to attach the tag and the piece of tape directly onto a specific position on the package or the box 80.

Figure 9:
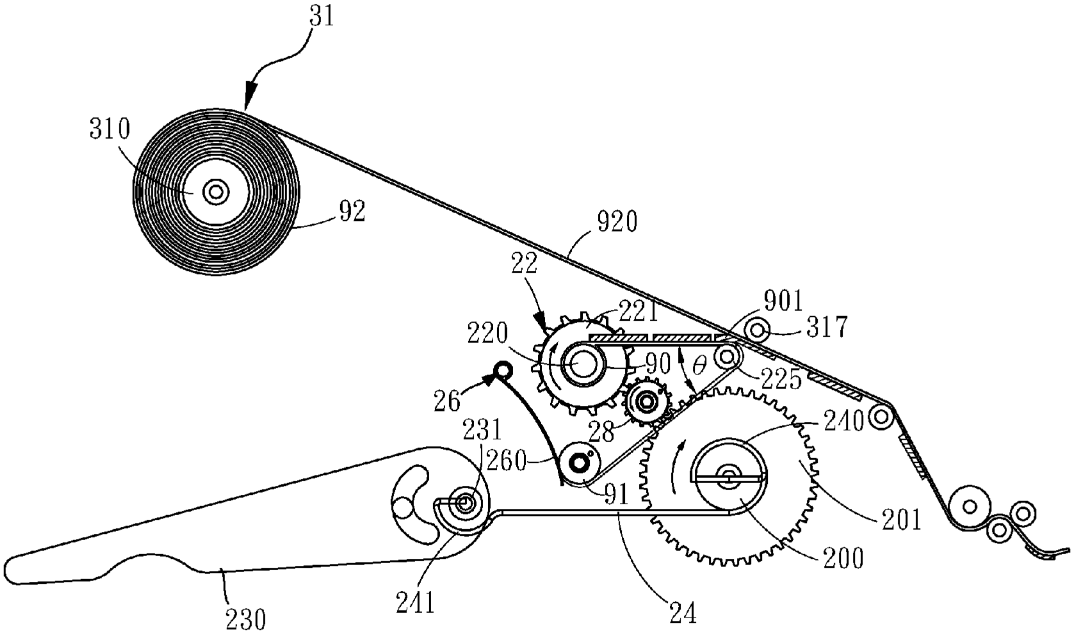
FIG. 9 is a schematic diagram of a tag-and-tape combination apparatus according to another embodiment of the present invention.

Please refer to FIG. 9, which is a schematic diagram of a tag-and-tape combination apparatus according to another embodiment of the present invention. The tag ablation mechanism of the present embodiment combines the mechanism in FIG. 1B and the tape roll. The tape roll 92 is disposed at one end of the driven gear 221. As the tape roll 92 is disposed on the tape rotating portion 31, the piece of tape 920 passes through and is pressed by an attachment roller 317 so that part of the piece of tape 920 is tangential to the tag on the bottom paper at an ablation wheel 225. When the user rotates the handling portion 230, the handling portion 230 rotates clockwise to drive the driving gear 201, the steering gear 28 and thus the driven gear 221 to rotate, of which the description is similar to the description with FIG. 3 and thus is not repeated herein. As the tag 901 passes through a tangential point where the tape is tangential to the ablation wheel 225, the tag 901 is attached onto the tape. The bottom paper passing through the ablation wheel 225 forms a bending angle θ so that part of the tag 901 is ablated from the bottom paper. Then, the part of the tag 901 ablated from the bottom paper is attached onto the tape. Meanwhile, the first shaft 200 continues to rotate until the tag 901 entirely passes through the bending angle θ and combines with the piece of tape 920 and is completely ablated from the bottom paper. During a rotation from bottom up of the handling portion 230, a tag 901 can be attached onto the piece of tape 920. The user can further use the combination apparatus 3 to enclose or package the object (for example, a package or a box) 80 or use the tape to attach the tag onto the surface of the object.

Figure 10A:
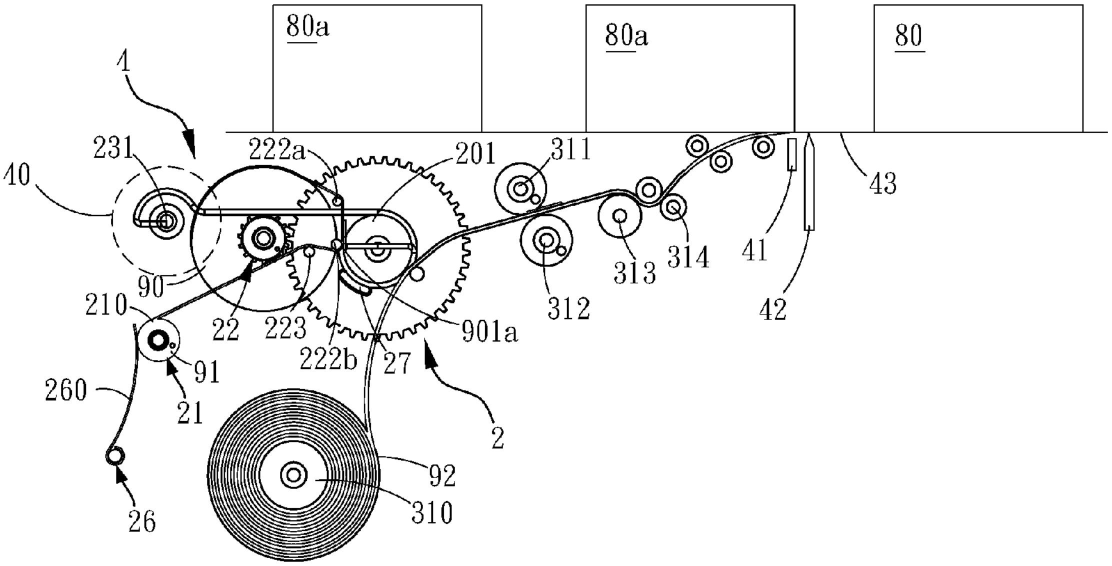
FIG. 10A and FIG. 10B are schematic diagrams of a tag-and-tape combination apparatus according to another embodiment of the present invention.
Figure 10B:
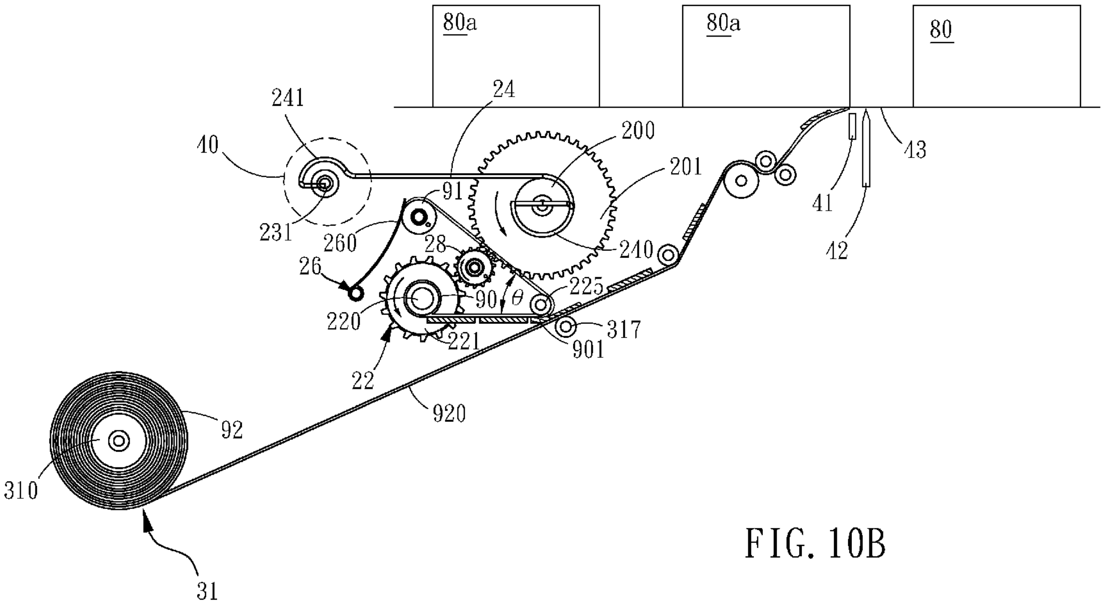

Please refer to FIG. 10A, which is a schematic diagram of a tag-and-tape combination apparatus according to another embodiment of the present invention. In the present embodiment, the tape is used to package an object or cover a tag on the surface of a box. The tag-and-tape combination apparatus 4 combines with an automated transported box or packages 80*a* and 80 so as to perform automated packaging on the objects 80*a* and 80 (boxes or packages). The tag-and-tape combination apparatus 4 is similar to the apparatus in FIG. 6 except that the rotary shaft 231 is driven by a rotating force unit 40, which can be a servo motor or a stepping motor or the like. The automated transport belt 43 is capable of transporting the objects 80*a* and 80. The automated transport belt is conventionally known, and thus description thereof is not presented herein. A sensor 41 and a cutting device 42 are further disposed under the automated transport belt 43. The automated transport belt 43 transports the object 80*a* that is to be packaged. When the object 80*a* contacts the tape, the tape is pulled with the object 80a so that the tape is attached onto a position on the surface of the object. When the sensor 41 senses that the object 80a has reached a specific position, the sensor 41 issues a signal to the cutting device 42. The cutting device 42 receives the signal and then cuts off the piece of tape attached onto the object 80a to complete packaging of the object 80. In FIG. 10B, the embodiment is essentially similar to that in FIG. 10A except that the mechanism in FIG. 9 is used to package the object.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A tag ablation mechanism, comprising:
- a driving portion comprising a first shaft and a driving gear coupled to the first shaft;
- a furling portion coupled to an end of a bottom paper extended from a tag roll so as to furl the bottom paper;
- a driven portion comprising a second shaft capable of carrying the tag roll and a driven gear coupled to the second shaft and toothed with the driving gear, the driven portion being propping against the bottom paper extended from the tag roll so that a bending angle is formed by the bottom paper;
- a rotatary portion capable of providing a rotating force; and
- a lever having two ends coupled respectively to the rotatary portion and the first shaft, the lever delivering the rotating force so that the driving portion drives the driven portion to rotate and a tag is ablated from the bottom paper at the bending angle.

2. The tag ablation mechanism as recited in claim 1, wherein the driven portion further comprises a plurality of driven wheels pressed against the bottom paper so that the bending angle is formed by the bottom paper.

3. The tag ablation mechanism as recited in claim 1, wherein the rotatary portion further comprises a handling portion, a rotary shaft and a resilient element, the handling portion being coupled to the rotary shaft and the resilient element, the rotary shaft being coupled to the lever.

4. The tag ablation mechanism as recited in claim 3, wherein the handling portion is further connected to a position adjustment means to adjust a rotation stroke of the handling portion.

5. The tag ablation mechanism as recited in claim 1, wherein the rotatary portion further comprises a rotating force supply and a rotary shaft, the rotating force supply being coupled to the rotary shaft and the rotary shaft being coupled to the lever.

6. The tag ablation mechanism as recited in claim 1, wherein the driving gear and the driven gear are uni-directioal gears.

7. The tag ablation mechanism as recited in claim 1, wherein the furling portion further comprises a furling shaft to furl the bottom paper.

8. The tag ablation mechanism as recited in claim 1, further comprising a steering gear toothed between the driven gear and the driving gear.

9. A tag-and-tape combination apparatus, comprising:
- a tape rotating portion capable of carrying a tape roll;
- a driving portion comprising a first shaft and a driving gear coupled to the first shaft;
- a furling portion coupled to an end of a bottom paper extended from a tag roll so as to furl the bottom paper;
- a driven portion comprising a second shaft capable of carrying the tag roll and a driven gear coupled to the second shaft and toothed with the driving gear, the driven portion being propping against the bottom paper extended from the tag roll so that a bending angle is formed by the bottom paper;
- a rotatary portion capable of providing a rotating force; and
- a lever having two ends coupled respectively to the rotatary portion and the first shaft, the lever delivering the rotating force so that the driving portion drives the driven portion to rotate and a tag is ablated from the bottom paper at the bending angle and attached on the first shaft rotating to combine the tag on the first shaft and a piece of tape from the tape roll.

10. The tag-and-tape combination apparatus as recited in claim 9, wherein the driven portion further comprises a plurality of driven wheels pressed against the bottom paper so that the bending angle is formed by the bottom paper.

11. The tag-and-tape combination apparatus as recited in claim 9, wherein the rotatary portion further comprises a handling portion, a rotary shaft and a resilient element, the handling portion being coupled to the rotary shaft, the rotary shaft being coupled to the lever, the resilient element having two ends respectively propping against a handle and the handling portion.

12. The tag-and-tape combination apparatus as recited in claim 11, wherein the handling portion is further connected to a position adjustment means to adjust a rotation stroke of the handling portion.

13. The tag-and-tape combination apparatus as recited in claim 9, wherein the rotatary portion further comprises a rotating force supply and a rotary shaft, the rotating force supply being coupled to the rotary shaft and the rotary shaft being coupled to the lever.

14. The tag-and-tape combination apparatus as recited in claim 9, wherein the driving gear and the driven gear are uni-directioal gears.

15. The tag-and-tape combination apparatus as recited in claim 9, wherein the furling portion further comprises a furling shaft to furl the bottom paper.

16. The tag-and-tape combination apparatus as recited in claim 9, further comprising a transport portion capable of transporting a packaged object disposed above the tape rotating portion, the transport portion comprising a sensor capable of sensing a position of the packaged object to generate a signal and a cutting device capable of receiving the signal to cut the piece of tape.

17. A tag-and-tape combination apparatus, comprising:
- a tape rotating portion capable of carrying a tape roll;
- a driving portion comprising a first shaft and a driving gear coupled to the first shaft;
- a furling portion coupled to an end of a bottom paper extended from a tag roll so as to furl the bottom paper;
- a driven portion comprising a second shaft capable of carrying the tag roll and a driven gear coupled to the second shaft and toothed with the driving gear by way of a steering gear, the driven portion being propping against the bottom paper extended from the tag roll so that a bending angle is formed by the bottom paper;
- a rotatary portion capable of providing a rotating force; and
- a lever having two ends coupled respectively to the rotatary portion and the first shaft, the lever delivering the rotating force so that the driving portion drives the driven portion to rotate so that a tag on the tag roll is combined with a piece of tape on the tape roll and is then ablated from the bottom paper at the bending angle while the first shaft is rotating.

18. The tag-and-tape combination apparatus as recited in claim 17, wherein the driven portion further comprises an ablation wheel pressed against the bottom paper on the tag roll so that the bending angle is formed by the bottom paper.

19. The tag-and-tape combination apparatus as recited in claim 17, wherein the rotatary portion further comprises a handling portion, a rotary shaft and a resilient element, the handling portion being coupled to the rotary shaft, the rotary shaft being coupled to the lever, the resilient element having two ends respectively propping against a handle and the handling portion.

20. The tag-and-tape combination apparatus as recited in claim 19, wherein the handling portion is further connected to a position adjustment means to adjust a rotation stroke of the handling portion.

21. The tag-and-tape combination apparatus as recited in claim 17, wherein the rotatary portion further comprises a rotating force supply and a rotary shaft, the rotating force supply being coupled to the rotary shaft and the rotary shaft being coupled to the lever.

22. The tag-and-tape combination apparatus as recited in claim 17, wherein the driving gear and the driven gear are uni-directioal gears.

23. The tag-and-tape combination apparatus as recited in claim 17, wherein the furling portion further comprises a furling shaft to furl the bottom paper.

24. The tag-and-tape combination apparatus as recited in claim 17, further comprising a transport portion capable of transporting a packaged object disposed above the tape rotating portion, the transport portion comprising a sensor capable of sensing a position of the packaged object to generate a signal and a cutting device capable of receiving the signal to cut the piece of tape.

* * * * *